(12) United States Patent
Hwang et al.

(10) Patent No.: US 7,076,081 B2
(45) Date of Patent: Jul. 11, 2006

(54) METHOD OF DESIGNING WATERMARK IN CONSIDERATION OF WIENER ATTACK AND WHITENING FILTERED DETECTION

(75) Inventors: Youngha Hwang, Seoul (KR); Kiryung Lee, Seoul (KR); Kyung Ae Moon, Taejon (KR); Myung Joon Kim, Taejon (KR)

(73) Assignee: Electronics and Telecommunications Research Institute, Taejon (KR)

( * ) Notice: Subject to any disclaimer, the term of this patent is extended or adjusted under 35 U.S.C. 154(b) by 699 days.

(21) Appl. No.: 10/271,530

(22) Filed: Oct. 17, 2002

(65) Prior Publication Data

US 2004/0001607 A1 Jan. 1, 2004

(30) Foreign Application Priority Data

Jun. 28, 2002 (KR) ................ 2002-37023

(51) Int. Cl.
*G06K 9/00* (2006.01)
(52) U.S. Cl. ...................... 382/100; 713/176
(58) Field of Classification Search .............. 382/100, 382/232, 240; 380/51, 54, 201, 210, 252, 380/287; 370/522–529; 713/176, 179; 283/72–79, 283/85, 93, 113, 901, 902; 705/57, 58; 348/461, 348/463; 725/9, 20, 22; 375/130
See application file for complete search history.

(56) References Cited

U.S. PATENT DOCUMENTS

| | | | |
|---|---|---|---|
| 5,848,155 A | | 12/1998 | Cox |
| 5,889,868 A | * | 3/1999 | Moskowitz et al. ........ 713/176 |
| 6,332,194 B1 | * | 12/2001 | Bloom et al. ............... 713/176 |
| 6,535,617 B1 | * | 3/2003 | Hannigan et al. ........... 382/100 |
| 6,625,295 B1 | * | 9/2003 | Wolfgang et al. ........... 382/100 |
| 6,792,129 B1 | * | 9/2004 | Zeng et al. ................... 382/100 |
| 2003/0182246 A1 | * | 9/2003 | Johnson et al. ............. 705/76 |
| 2004/0006696 A1 | * | 1/2004 | Shin et al. ................... 713/176 |

OTHER PUBLICATIONS

Youngha Hwang, et al.; *Watermark design for the Wiener attack and whitening filtered* detection; Security and Watermarking of Multimedia Contents IV; SPIE; Proceedings of SPIE; vol. 4675; Jan. 21-24, 2002; San Jose; pp. 441-449.

Jonanthan Ko. Su, Bernd Girod; *On the Robustness and Imperceptibility of Digital Fingerprints*; Proc. IEEE Intl. Conf. Multimedia Computing & Systems (ICMCS '99); Jun. 1999; vol. 2; Florence, Italy pp. 530-535.

* cited by examiner (Continued)

*Primary Examiner*—Jingge Wu
*Assistant Examiner*—Abolfazl Tabatabai
(74) *Attorney, Agent, or Firm*—Mayer, Brown, Rowe & Maw LLP

(57) ABSTRACT

Disclosed a method of designing a watermark having the power spectral density optimized so that the detection performance can be improved by employing the whitening filtered detection after the Wiener attack. The power spectral density of the watermark is designed using an optimization method that can improve the entire detection performance by reflecting the gain of the whitening filter after the Wiener attack. A higher detection gain is obtained using the whitening filter after the Wiener attack, and the expected value of the difference between test statistics of the two hypotheses that the watermark exists and the watermark does not exist, respectively, is maximized to optimize the detection performance. Regarding the expected value of the difference between the test statistics as an objective function, the power spectral density of the watermark, which corresponds to a maximum differentiated value of the power spectral density of the watermark using the Lagrange multiplier method, is obtained.

14 Claims, 4 Drawing Sheets

METHOD OF DESIGNING WATERMARK IN CONSIDERATION OF WIENER ATTACK AND WHITENING FILTERED DETECTION

BACKGROUND OF THE INVENTION

1. Field of the Invention

The present invention relates to a watermark, and more particularly, to a method of designing a watermark having the power spectral density optimized so that the performance of detecting watermark can be improved by employing the whitening filtered detection after the Wiener attack.

2. Background of the Related Art

Generally, digital media such as audio, image and video have been rapidly increased. Since such digital media products can be easily distributed, forged and copied, it is necessary to protect their copyrights. Digital watermarking has been appeared as a popular means for satisfying such necessity. A digital watermark is hidden information permanently remaining in a digital signal without being perceived by humans. This watermark has information related to an owner, distributor and receiver of the digital signal. When the owner of this digital type work is inquired, it can be recognized through the extraction of inserted information.

As a security means for strengthening the copyright, the watermark should not be perceivable by the human visual system, the human auditory system and so on. Thus, the energy of the watermark should be small enough so that the watermark cannot be perceived. Also, the watermark should be robust so as to resist intentional or unintentional attack.

The unintentional attack means a loss of information in common signal processing such as lossy compression, low-pass filtering, scaling, digital-to-analog or analog-to-digital conversion, resampling, etc. The intentional attack means a removal operation of the watermark within preserving the quality of the digital contents.

Meanwhile, an algorithm for embedding the watermark should be secure enough so that the embedded watermark cannot be removed even if the algorithm becomes known. That is, only the copyright holder can access the watermark.

The most important thing is that the copyright holder can be accurately discriminated by the watermark.

A well-known power spectrum condition is derived as a defense against the Wiener attack. The Wiener attack means estimation and extraction of the embedded watermark from the signal including the watermark for the purpose of obstructing the detection of the watermark. According to the power spectrum condition, the power spectral density of the watermark should be in proportion to the power spectral density of the original signal. This is because it is difficult to estimate the watermark from the signal including the watermark in case of conforming to the power spectrum condition. However, the power spectrum condition considers only the detection based on a correlation, but does not consider employing the whitening filter prior to the detection.

FIG. 1 is a graph illustrating the power spectral density of the watermark and the original signal according to a conventional method.

According to the conventional method, the power spectral density of the watermark is designed to be in proportion to the power spectral density of the original signal. This proportion of the power spectral densities makes the estimation of the watermark due to an invasion and so on difficult. However, in the conventional watermark design, the whitening filter is not considered.

Meanwhile, in an article by Jonathan K. Su and Bernd Girod, entitled "On the Robustness and Imperceptibility of Digital Fingerprints", Proc. IEEE Conf. on Multimedia Computing and Systems, pp. 530–535, vol. 2, June 1999, it is described that in most digital watermarking applications, the most preferable characteristics are robustness and imperceptibility. This article shows a theoretical analysis of the watermarking. Here, an attacker estimates the watermark using the Wiener filter.

The robustness and the imperceptibility of the watermark can be represented by an L2 efficiency, which indicates the energy of the watermark that the attacker can remove. The article shows that the power spectrum condition should be satisfied for the maximum L2 efficiency. That is, the power spectrum of the watermark should be the one obtained by reducing the power spectrum of the original signal in a specified ratio. A watermark that satisfies the power spectrum condition is the most efficient one among the watermarks independent from the original signal. In the analysis of one-dimensional and two-dimensional signal models and experiments using actual images, the watermark that satisfies the power spectrum condition shows an excellent performance.

Also, in U.S. Pat. No. 5,848,155, entitled "Spread Spectrum Watermark for Embedded Signaling", a watermark is embedded into audio, video and image multimedia data using spread spectrum methodology. This patent overcomes the limitations of the prior systems using a spread spectrum watermarking method that embeds a watermark or certain information into perceptually significant regions of an image. Specifically, according to this patent, the watermark can be extracted from the watermarked data without using the original data. The preferred method of watermarking extraction is to use a spatial or temporal local average of the frequency coefficients of the watermarked data to determine the watermark. For instance, the frequency coefficients of a two-dimensional neighborhood in two-dimensional watermarked data, i.e., an image, are analyzed to reproduce the entire watermark. This is possible since the watermark is embedded into the data using spread spectrum technology that spreads the watermark throughout the data.

Meanwhile, the Wiener attack means to estimate the watermark using the Wiener filter and to obstruct the detection by subtracting the estimated watermark from the watermarked data. The robustness and the imperceptibility of the watermark can be measured by the energy of the estimated watermark that can be removed by the Wiener attack. Regarding the energy of the estimated watermark, the most efficient watermark should satisfy the power spectrum condition. That is, the power spectrum of the watermark is obtained by reducing the power spectrum of the original signal in a specified ratio. In case of using the matched filter only, the power spectrum condition compliant watermark shows the optimal performance against the Wiener attack. However, in case of employing the whitening filter prior to the detection, the whitening filter provides no gain for the power spectrum compliant watermark.

SUMMARY OF THE INVENTION

Accordingly, the present invention is directed to a method of designing a watermark in consideration of the Wiener attack and the whitening filtered detection that substantially obviates one or more problems due to the limitations and the drawbacks of the related art. The present invention is for designing the power spectral density of the watermark using an optimization method so that the entire performance of the detection can be improved by reflecting the gain of the whitening filter after the Wiener attack.

Also, the present invention is for obtaining a higher detection gain using the whitening filter after the Wiener attack, and maximizing the expected value of the difference between the test statistics of the hypotheses that the watermark exists and the watermark does not exist, respectively, to optimize the detection performance. Specifically, regarding the expected value of the difference between the test statistics as an objective function, the power spectral density of the watermark, which corresponds to a maximum differentiated value of the power spectral density of the watermark using the Lagrange multiplier method, is obtained. Here, the energy of the watermark is given as a condition, so the scale factor of the watermark can be adjusted to match the energy.

As described above, an object of the present invention is to provide a method of designing a watermark that makes a strong defense against the Wiener attack and considers the whitening filtered detection.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a method of designing a watermark that improves the detection performance by maximizing the expected value of the difference between the test statistics of the two hypotheses where the watermark exists and where the watermark does not exist, respectively, in the following equation.

$$E[T_1(y) - T_0(y)],$$

where $T_1(y) = (x + w - h*(x+w))^T R_x^{-1} w$, and $T_0(y) = (x - h*x)^T R_x^{-1} w$.

Also, the above equation that maximizes the difference between the test statistics according to the present invention can be simply expressed by maximizing the objective function given by the following equation.

$$\frac{1}{2\pi} \int_{-\pi}^{\pi} \frac{\Phi_w(\Omega)}{\Phi_x(\Omega) + \Phi_w(\Omega)} d\Omega,$$

where $\Phi_x(\Omega)$ is the power spectral density of the original signal, $\Phi_w(\Omega)$ is the power spectral density of the watermark, and $\Omega$ is a frequency within the range of $[-\pi, \pi)$.

Also, according to the present invention, the optimized power spectrum of the watermark as shown in the following equation is obtained from the objective function using the Lagrange multiplier method.

$$\Phi_w(\Omega) = -\Phi_x(\Omega) + \frac{\sqrt{\Phi_x(\Omega)}}{\frac{1}{2\pi} \int_{-\pi}^{\pi} \sqrt{\Phi_x(\Omega)} d\Omega} (\sigma_x^2 + \sigma_w^2),$$

where $\sigma_x^2$ is the variance of the original signal, and $\sigma_w^2$ is the variance of the watermark.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENT

The method of designing a watermark according to the preferred embodiment of the present invention will now be explained in detail with reference to the accompanying drawings.

Figure 1:
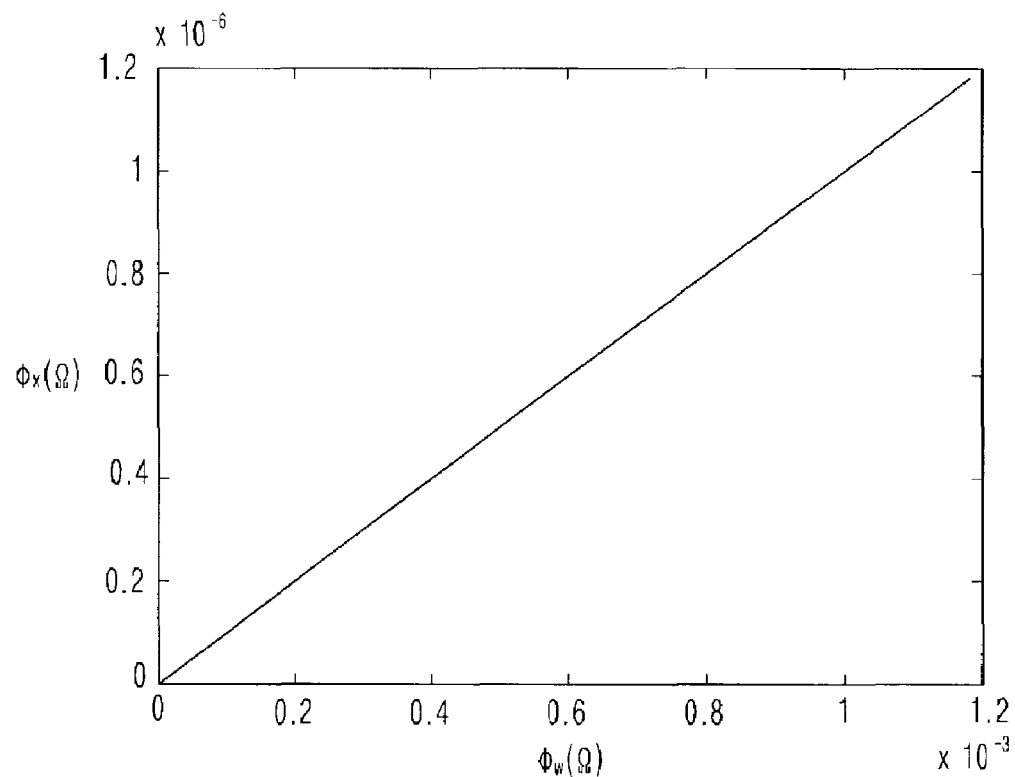
FIG. 1 is a graph illustrating the power spectral density of a watermark and an original signal according to a conventional method.
Figure 2:
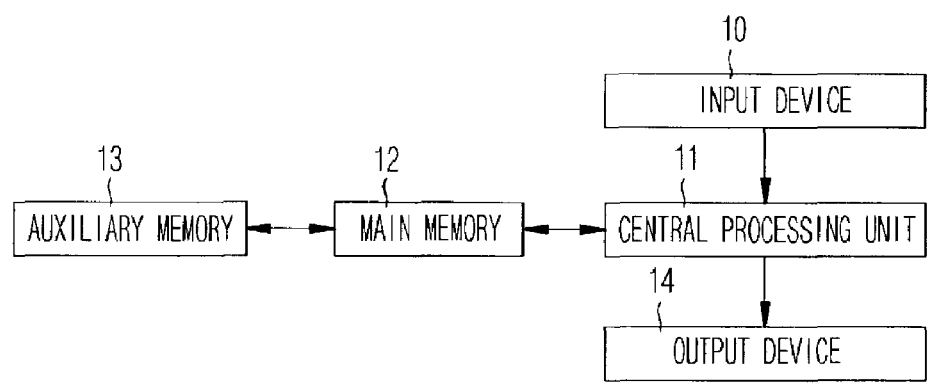
FIG. 2 is a block diagram of a terminal that can perform a watermark in consideration of the whitening filtered detection according to the present invention.

FIG. 2 is a block diagram of a terminal that can perform watermarking in consideration of the whitening filtered detection according to the present invention.

The terminal is provided with a central processing unit 11, a main memory 12 connected to the central processing unit 11, an auxiliary memory 13 connected to the main memory 12, and input and output devices 10 and 14 connected to the central processing unit 11.

The central processing unit 11 controls and manages the whole operation of the terminal, and the main memory 12 and the auxiliary memory 13 store programs to be performed by the central processing unit 11 and various kinds of data used or produced during the operation of the terminal. The input device 10 and the output device are for data input/output with a user.

The auxiliary memory 13 serves to store a large capacity of data. The input device 10 includes user input means such as a general keyboard, mouse, tablet, touch screen, etc, and the output device 14 includes a display, printer, video recorder, etc.

In detecting the watermark, the original signal (i.e., an image, audio, etc.) is considered as a noise, and generally has a colored power spectrum.

Accordingly, by applying the whitening filter to the watermark detection operation, the detection performance can be greatly improved. If the power spectral density of the watermark is equal to the power spectral density of the original signal when using the whitening filter, the gain of the whitening filter becomes 1, and the detection performance doesn't improve although the watermark can resist quite effectively the Wiener attack. On the contrary, when the power spectral density of the watermark is different from the power spectral density of the original signal, the watermark can be removed by the Wiener attack. In spite of that, the detection performance does improve because the gain of the whitening filter increases.

As described above, the present invention is for designing a watermark that is robust to the Wiener attack, considers the gain of the whitening filter, and thus has an improved detection performance.

In order for the watermark according to the present invention to be robust to the Wiener attack and to show an improved performance in the whitening filtered detection, a new modified condition according to the present invention should be satisfied instead of the conventional power spectrum condition (PSC).

The watermark $w[n]$ of the present invention is a N-dimensional wide-sense stationary (WSS) Gaussian random process with zero mean, and variance $\sigma_w^2$, and interacts with variables such as the power spectral density $\Phi_w(\Omega)$.

In the same manner, the original signal $x[n]$ has variance $\sigma_x^2$ and a power spectral density $\Phi_x(\Omega)$. Meanwhile, $\Omega$ is a frequency within the range of $[-\pi,\pi)$.

The embedding of the watermark is performed as follows.

$$y[n]=x[n]+w[n] \quad (1)$$

In the equation (1), the embedding of the watermark is performed in a manner that the watermark signal $w[n]$ is added to the original signal $x[n]$.

In many cases, a receiver detects the watermark by calculating a correlation.

Here, from a viewpoint of the watermark $w[n]$, the original signal $x[n]$ is considered as a colored noise, and the detection performance is greatly improved by the whitening filter.

Meanwhile, in order to decide a Neyman-Pearson detector, and a likelihood ratio test (LRT) is decided by the following equations. Distribution of respective hypotheses are given by $$p(y; H_1) = \frac{1}{(2\pi)^{\frac{N}{2}} \det^{\frac{1}{2}}(R_x)} \exp\left[-\frac{1}{2}(y-w)^T R_x^{-1}(y-w)\right], \quad H_1; y \sim N(w, R_x)$$

$$p(y; H_0) = \frac{1}{(2\pi)^{\frac{N}{2}} \det^{\frac{1}{2}}(R_x)} \exp\left[-\frac{1}{2} y^T R_x^{-1} y\right], \quad H_0; y \sim N(0, R_x)$$

At this time, $R_x$ is the covariance matrix of the original signal $x[n]$.

Meanwhile, decision of the test statistics by applying LRT in the hypotheses having the distribution of the above two equations is given by the following equation.

If $$T(y) = y^T R_x^{-1} w > \eta,$$

is selected $H_1$.

Here, $\eta$ is the detection threshold, and is decided by selection.

In the above equation, if $T(y)$ is larger than the detection threshold $\eta$, $H_1$ is selected.

Meanwhile, the Wiener attack and the power spectrum condition (PSC) will be explained.

The Wiener attack is the removal of the estimated watermark, where the estimation is performed from the watermarked signal, in order to prevent the detection of the watermark.

The attacked signal is given by $$\hat{y}[n]=y[n]-\gamma\hat{w}[n]=y[n]-\gamma h[n]*y[n].$$

In this equation, $h[n]$ is the impulse response of the Wiener filter, and $\gamma(\geq 0)$ is a scalar gain factor.

As is known, a conversion function $H(\Omega)$ is given by $$H(\Omega) = \frac{\Phi_{wy}(\Omega)}{\Phi_{yy}(\Omega)} = \frac{\Phi_{ww}(\Omega)}{\Phi_{xx}(\Omega) + \Phi_{ww}(\Omega)}.$$

In order for the watermark to be robust against the Wiener attack, the estimation of the watermark should necessarily be difficult.

To make the estimation of the watermark difficult, we should maximize the MSE $E=E[(w(n)-\hat{w}(n))^2]$, and this condition is called the power spectrum condition (PSC). Also, the power spectral density of the watermark is given by the following equation.

$$\Phi_w(\Omega) = \frac{\sigma_w^2}{\sigma_x^2} \Phi_x(\Omega).$$

This equation means that the power spectral density of the watermark should be in proportion to the power spectral density of the original signal.

As described above, however, in case of the watermark that satisfies the power spectrum condition (PSC), there is no detection gain of the whitening filter, and thus the detection performance is poor in comparison to the white noise watermark.

On the contrary, if the power spectral density is different from the power spectral density of the original signal, the detection performance of the whitening filter improves, but the Wiener attack considerably removes the watermark from the received signal. Accordingly, the present invention provides a watermark designing method that satisfies the two conditions.

Figure 3:
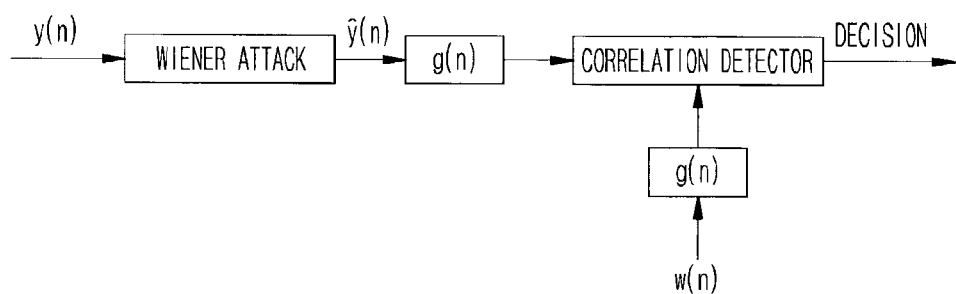
FIG. 3 is a block diagram illustrating the Wiener attack and the whitening filter.

FIG. 3 is a block diagram illustrating the Wiener attack and the whitening filter.

$y[n]$ denotes a received signal including the watermark $w[n]$ and the original signal $x[n]$, $g[n]$ the impulse response of the whitening filter after the Wiener attack, and $w[n]$ the watermark signal. A correlation detector performs a detection based on correlation between the two signals. After the Wiener attack, the signal passes through the whitening filter $g[n]$, and then existence/nonexistence of the watermark is finally discriminated through the correlation detector.

The optimum watermark designing in consideration of the whitening filter according to the present invention first maximizes the following equation.

$$E[T_1(y)-T_0(y)] \quad (2)$$

The test statistics of the two hypotheses are as follows.

$$T_1(y) = (x + w - h*(x+w))^T R_x^{-1} w \qquad (3)$$

$$T_0(y) = (x - h*x)^T R_x^{-1} w \qquad (4)$$

In the equations (3) and (4), if the spectrums of the test statistics existing in the respective hypotheses are sufficiently separated, the detection performance is improved.

Meanwhile, the difference between the test statistics is calculated by $$T_1(y) - T_0(y) = (w - h*w)^T R_x^{-1} w \qquad (5)$$

In the equation (5), if the expected value is taken on the right and the left hand side of the equation on condition that h*w=w', the following equation is obtained.

$$E[T_1(y) - T_0(y)] = E[w^T R_x^{-1} w] - E[w'^T R_x^{-1} w].$$

From the above equation are obtained $$E[w(n)^T R_x^{-1} w(n)] = \frac{1}{2\pi} \int_{-\pi}^{\pi} \frac{\Phi_w(\Omega)}{\Phi_x(\Omega)} d\Omega, \text{ and}$$

$$E[w'(n)^T R_x^{-1} w(n)] = \frac{1}{2\pi} \int_{-\pi}^{\pi} \frac{H(\Omega)\Phi_w(\Omega)}{\Phi_x(\Omega)} d\Omega.$$

Accordingly, the result of the difference between the test statistics is given by $$E = \frac{1}{2\pi} \int_{-\pi}^{\pi} \frac{\Phi_w(\Omega) - H(\Omega)\Phi_w(\Omega)}{\Phi_x(\Omega)} d\Omega = \frac{1}{2\pi} \int_{-\pi}^{\pi} \frac{\Phi_w(\Omega)}{\Phi_w(\Omega) + \Phi_x\Omega} d\Omega,$$

and thus $$\frac{1}{2\pi} \int_{-\pi}^{\pi} \Phi_w(\Omega) d\Omega = \sigma_w^2.$$

Consequently, maximizing the equation (2) is to design the watermark that maximizes the following equation as described above.

$$\frac{1}{2\pi} \int_{-\pi}^{\pi} \frac{\Phi_w(\Omega)}{\Phi_x(\Omega) + \Phi_w\Omega} d\Omega \qquad (6)$$

That is, the watermark is designed so as to maximize the power spectral density $\Phi_x(\Omega)$ of the original signal and the power spectral density $\Phi_w(\Omega)$ of the watermark in the frequency range of $[-\pi,\pi)$.

In order to maximize the equation (6), the power spectral density of the watermark is first extracted using the Lagrange multiplier method.

The Lagrangian value J is defined by the following equation.

$$J = \frac{1}{2\pi} \int_{-\pi}^{\pi} \left[ \frac{\Phi_w(\Omega)}{\Phi_w(\Omega) + \Phi_x\Omega} + \lambda \Phi_w(\Omega) \right] d\Omega.$$

At this time, $g(\Phi_w(\Omega))$ is an integrand.

Accordingly, using J, the maximum value can be obtained on the condition given by the following equation.

$$\frac{\partial g}{\partial \Phi_w} = \frac{\Phi_x(\Omega)}{(\Phi_x(\Omega) + \Phi_w(\Omega))^2} + \lambda = 0.$$

Consequently, the power spectral density of the watermark can be obtained by the following equation.

$$\Phi_w(\Omega) = -\Phi_x(\Omega) + \frac{\sqrt{\Phi_x(\Omega)}}{\sqrt{-\lambda}} \qquad (7)$$

The power spectral density $\Phi_w(\Omega)$ of the watermark should be a positive real number. The power spectral density having a negative value is removed.

In the equation (7), by substituting the power spectral density $\Phi_w(\Omega)$ of the watermark for the power constraint $$\frac{1}{2\pi} \int_{-\pi}^{\pi} \Phi_w(\Omega) d\Omega = \sigma_w^2,$$

the following equation is obtained.

$$\sigma_w^2 = -\sigma_x^2 + \frac{1}{2\pi\sqrt{-\lambda}} \int_{-\pi}^{\pi} \sqrt{\Phi_x(\Omega)} \, d\Omega.$$

Accordingly, $$\lambda = -\left( \frac{\int_{-\pi}^{\pi} \sqrt{\Phi_x(\Omega)} \, d\Omega}{2\pi(\sigma_w^2 + \sigma_x^2)} \right)^2.$$

By substituting this result in the equation (7), the optimized power spectral density of the watermark can be obtained using the Lagrange multiplier method.

$$\Phi_w(\Omega) = -\Phi_x(\Omega) + \frac{\sqrt{\Phi_x(\Omega)}}{\frac{1}{2\pi} \int_{-\pi}^{\pi} \sqrt{\Phi_x(\Omega)} \, d\Omega} (\sigma_x^2 + \sigma_w^2) \qquad (8)$$

That is, the optimum method of designing the watermark, which is robust against the Wiener attack and has an excellent detection performance even when the whitening filter is used, should satisfy the equation (8).

The above equation (8) shows the power spectral density of the designed watermark w[n], and indicates that the power spectral density $\Phi_w(\Omega)$ of the watermark is not in proportion to the power spectral density $\Phi_x(\Omega)$ of the original signal. Also, the equation (8) represents a convex curve. If $\sqrt{\Phi_x(\Omega)}$ is too large, the power spectral density $\Phi_w(\Omega)$ of the watermark is reduced on the contrary, and thus if the large power spectral density $\Phi_w(\Omega)$ of the watermark is in proportion to the power spectral density $\Phi_x(\Omega)$ of the original signal, the operating efficiency is not good.

Since the power spectral density $\Phi_w(\Omega)$ of the watermark is always positive, the following condition can be obtained.

$$\sigma_w^2 \geq \frac{\sqrt{\Phi_x(\Omega)}}{2\pi} \int_{-\pi}^{\pi} \sqrt{\Phi_x(\Omega)}\, d\Omega - \sigma_x^2 \qquad (9)$$

If the designed watermark does not satisfy the above condition, the optimum watermark cannot be obtained.

Figure 4:
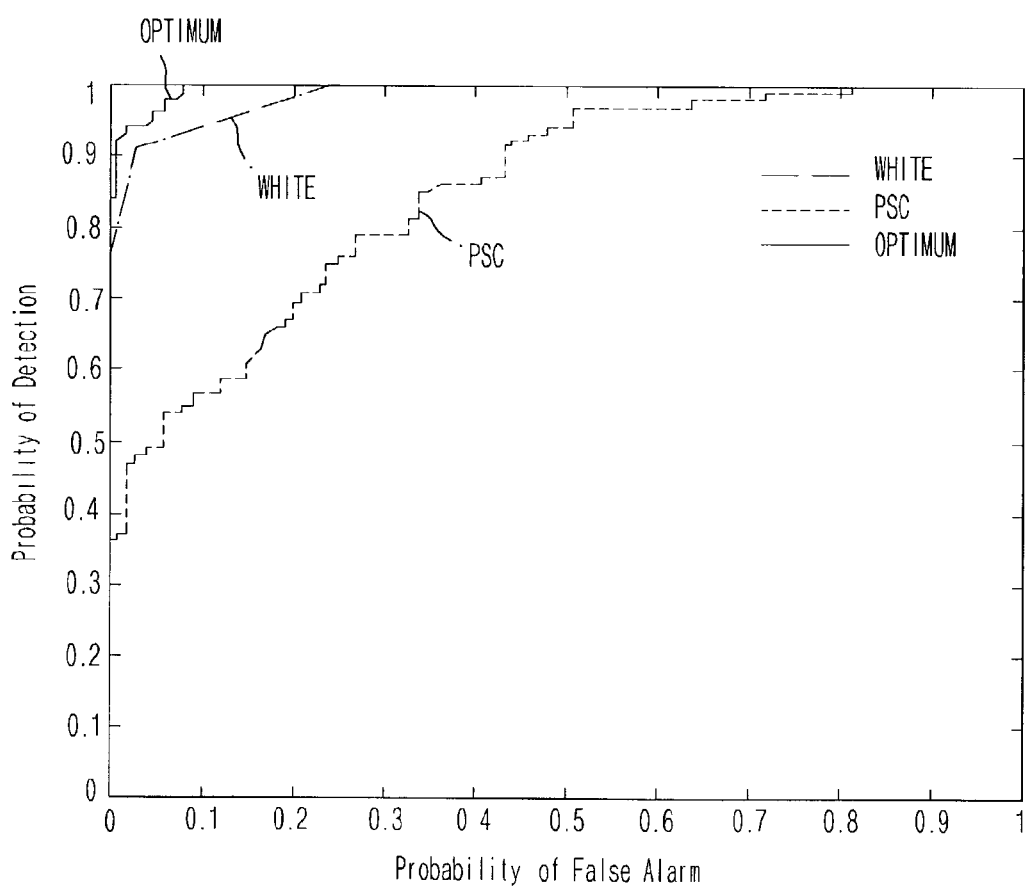
FIG. 4 is a graph illustrating receiver operating characteristics in case that WDR=−20 dB.
Figure 5:
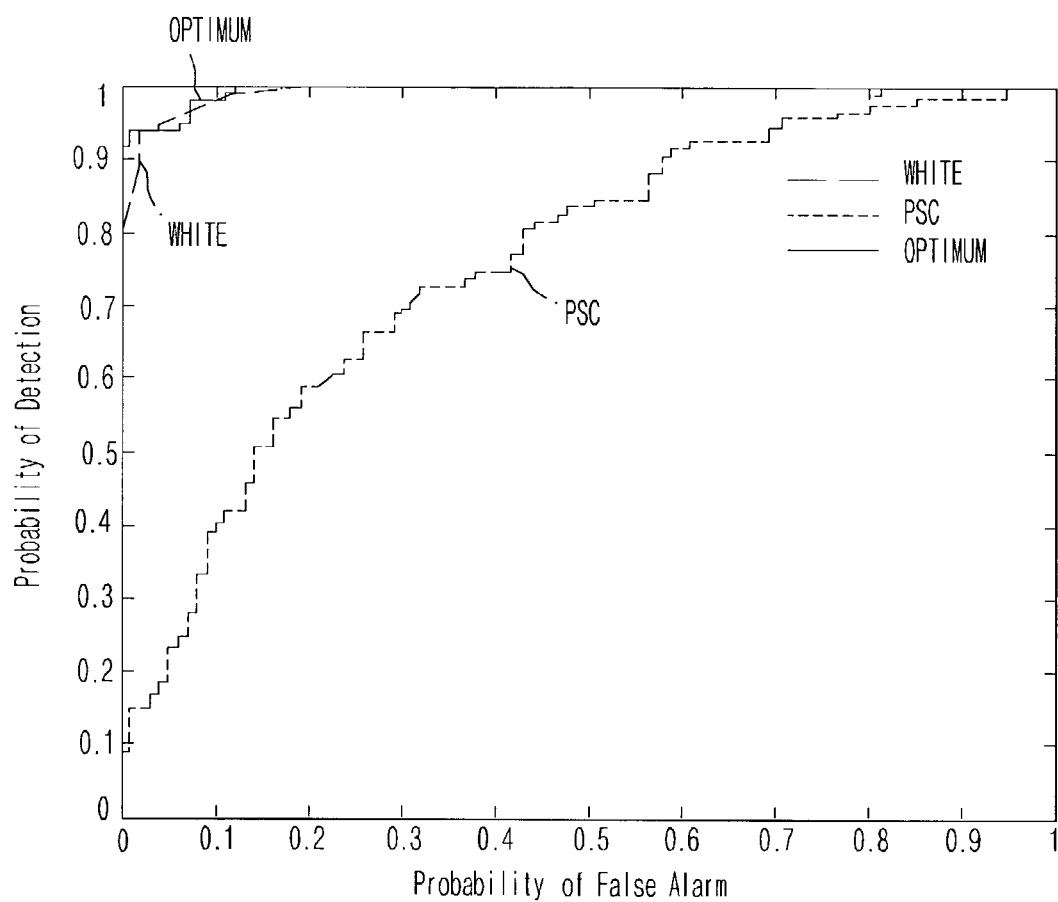
FIG. 5 is a graph illustrating receiver operating characteristics in case that WDR=−30 dB.

FIGS. 4 and 5 are graphs of compared performances of the white noise watermark, the watermark satisfying the PSC, and the watermark provided by the designing method according to the present invention when the watermark document ratio (WDR)=−20 dB and WDR=−30 dB, respectively. In FIGS. 4 and 5, the optimum watermark corresponds to the watermark according to the present invention.

FIGS. 4 and 5 illustrate the receiver operating characteristics, and show the relation between a probability of false alarm and a normal probability of detection. Under the same probability of false alarm, the performance becomes better as the probability of detection becomes higher. A better performance is shown under the ratio of the watermark to the original signal of −20 dB and −30 dB. As shown in the drawings, the WDR of the watermark designed by the optimization method between −20 dB and −30 dB represents an improved detection performance.

Figure 6:
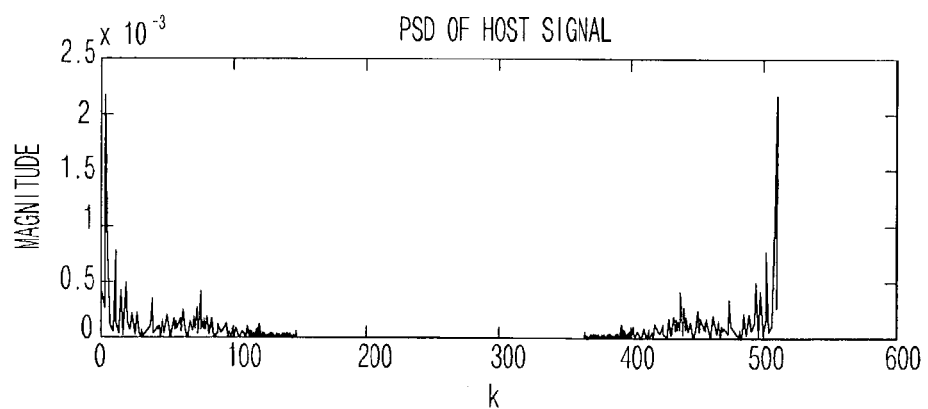
FIG. 6 is a graph of the power spectral density $\Phi_x(\Omega)$ of the original signal.
Figure 7:
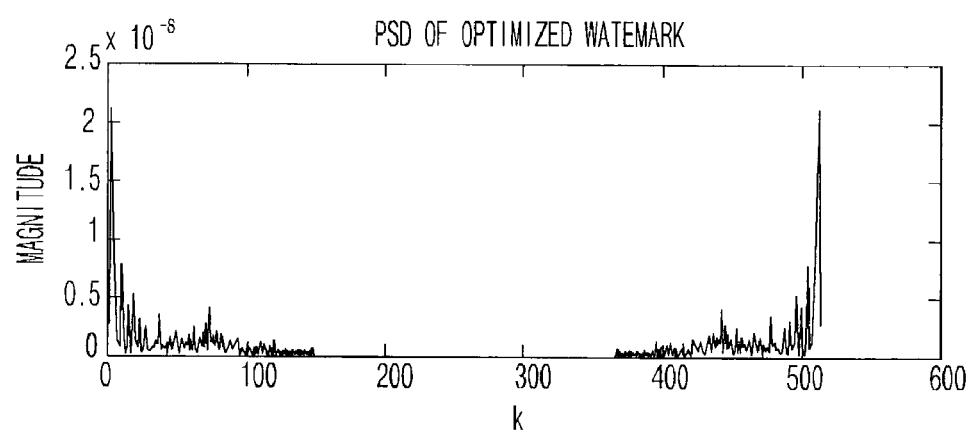
FIG. 7 is a graph of the power spectral density $\Phi_w(\Omega)$ of the watermark according to the present invention.

FIG. 6 is a graph of a power spectral density $\Phi_x(\Omega)$ of the original signal, and FIG. 7 is a graph of a power spectral density $\Phi_w(\Omega)$ of the watermark according to the present invention.

Generally, for a better detection through the whitening filter, the power spectral density of the watermark should be in high-frequency regions. However, as shown in FIG. 7, even if the power spectral density of the watermark is concentrated in low-frequency regions, a good detection performance is shown after the whitening filtering.

As described above, the watermark having the optimum condition according to the present invention is obtained by the following equation.

$$T = \sigma_x^2 + \sigma_w^2 - \frac{\sqrt{\Phi_x(\Omega)}}{2\pi} \int_{-\pi}^{\pi} \sqrt{\Phi_x(\Omega)}\, d\Omega \geq 0 \qquad (10)$$

In the above equation, T is the optimized test statistics.

Figure 8:
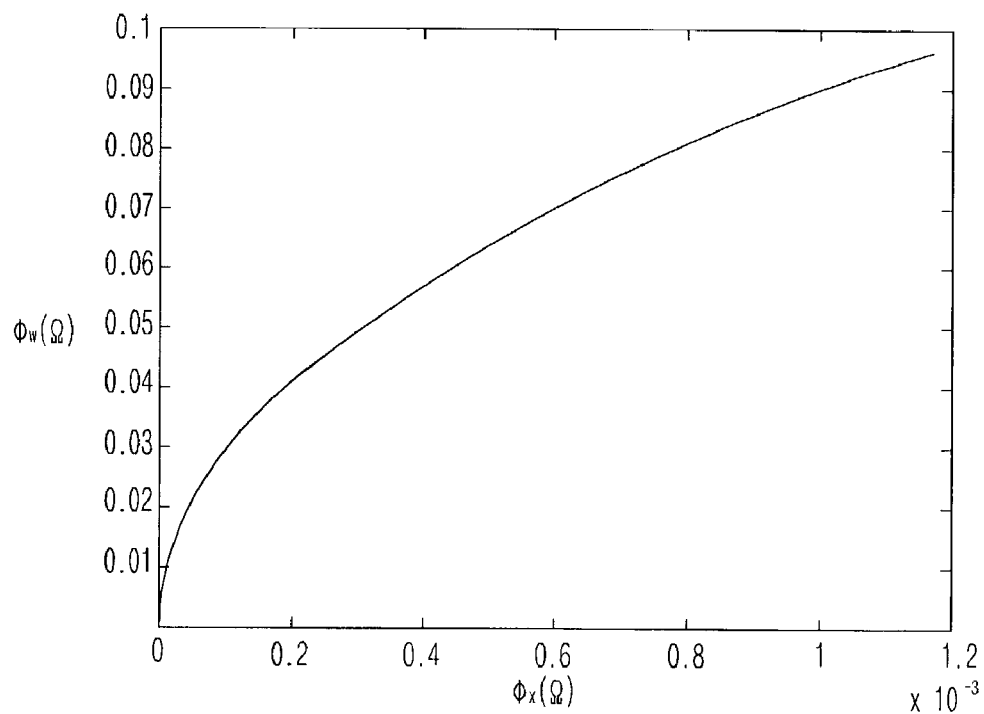
FIG. 8 is a graph illustrating the correlation of the power spectral densities of the watermark and the original signal according to the present invention when the optimal result is obtained.

FIG. 8 illustrates the watermark according to the present invention showing the optimum result. There is not a great difference between the power spectral density of the watermark designed according to the present invention and the power spectral density of the original signal, but the performance of the whitening filtered detection improves.

As described above, the watermark designed according to the present invention shows an improved detection performance in a detection environment using the whitening filter after the Wiener attack.

If the power spectral density of the watermark is identical to the power spectral density of the original signal, the gain of the whitening filter becomes 1, and thus the detection performance is not improved. Also, if the power spectral density of the watermark is opposite to the power spectral density of the original signal, the watermark is easily removed by the Wiener attack even if the whitening filter has any gain, and this deteriorates the detection performance of the whitening filter. On the contrary, according to the present invention, the detection performance is improved using the watermark having the optimized power spectral density in consideration of both the Wiener attack and the whitening filter.

While the present invention has been described illustrated herein with reference to the preferred embodiment thereof, it will be understood by those skilled in the art that various changes and modifications may be made to the invention without departing from the spirit and scope of the invention, which is defined in the appended claims.

What is claimed is:

1. A method of designing a watermark in consideration of the watermark being subjected to a Wiener attack and a whitening filtered detection, the method comprising the steps of:

defining an expected value of the difference between test statistics of two hypotheses where the watermark exists and where the watermark does not exist, respectively, as an objective function of the method;

calculating the objective function of the method for improving the detection performance by an equation using the power spectral density of an original signal and the power spectral density of the watermark; and obtaining an optimized power spectral density of the watermark from the objective function using a Lagrange multiplier method.

2. The method as claimed in claim 1, wherein the expected value of the difference of the test statistics is defined by the equation $E[T_1(y)-T_0(y)]$, and is used as the objective function of the optimization method for improving the detection performance, where $$T_1(y) = (x + w - h*(x+w))^T R_x^{-1} w$$

is the test statistic of the hypothesis where the watermark exists, and $$T_0(y) = (x - h*x)^T R_x^{-1} w$$

is the test statistic of the hypothesis where the watermark does not exist.

3. The method as claimed in claim 1, wherein the objective function is calculated by the equation $$\frac{1}{2\pi} \int_{-\pi}^{\pi} \frac{\Phi_w(\Omega)}{\Phi_x(\Omega) + \Phi_w(\Omega)}\, d\Omega,$$

where $\Phi_x(\Omega)$ is the power spectral density of the original signal, $\Phi_w(\Omega)$ is the power spectral density of the watermark, and $\Omega$ is a frequency within the range of $[-\pi, \pi)$.

4. The method as claimed in claim 1, wherein the power spectral density of the optimized watermark obtained from the objective function is calculated by the equation $$\Phi_w(\Omega) = -\Phi_x(\Omega) + \frac{\sqrt{\Phi_x(\Omega)}}{\frac{1}{2\pi}\int_{-\pi}^{\pi}\sqrt{\Phi_x(\Omega)}\,d\Omega}(\sigma_x^2 + \sigma_w^2),$$

where $\sigma_x^2$ is the variance of the original signal, and $\sigma_w^2$ is the variance of the watermark.

5. A method of detecting a watermark, comprising:

designing the watermark, comprising:

defining an expected value of the difference between test statistics of two hypotheses where the watermark exists and where the watermark does not exist, respectively, as an objective function of the method;

calculating the objective function of the method for improving the detection performance by an equation using the power spectral density of an original signal and the power spectral density of the watermark; and obtaining an optimized power spectral density of the watermark from the objective function using a Lagrange multiplier method; and filtering the watermark from the original signal to detect the watermark.

6. The method as claimed in claim 5, wherein the step of filtering the watermark further comprising filtering the watermark using a whitening filter.

7. The method as claimed in claim 5, wherein the expected value of the difference of the test statistics is defined by the equation $E[T_1(y)-T_0(y)]$, and is used as the objective function of the optimization method for improving the detection performance, where $$T_1(y) = (x + w - h*(x+w))^T R_x^{-1} w$$

is the test statistic of the hypothesis where the watermark exists, and $$T_0(y) = (x - h*x)^T R_x^{-1} w$$

is the test statistic of the hypothesis where the watermark does not exist.

8. The method as claimed in claim 5, wherein the objective function is calculated by the equation $$\frac{1}{2\pi}\int_{-\pi}^{\pi}\frac{\Phi_w(\Omega)}{\Phi_x(\Omega)+\Phi_w(\Omega)}d\Omega,$$

where $\Phi_x(\Omega)$ is the power spectral density of the original signal, $\Phi_w(\Omega)$ is the power spectral density of the watermark, and $\Omega$ is a frequency within the range of $[-\pi, \pi)$.

9. The method as claimed in claim 5, wherein the power spectral density of the optimized watermark obtained from the objective function is calculated by the equation $$\Phi_w(\Omega) = -\Phi_x(\Omega) + \frac{\sqrt{\Phi_x(\Omega)}}{\frac{1}{2\pi}\int_{-\pi}^{\pi}\sqrt{\Phi_x(\Omega)}\,d\Omega}(\sigma_x^2 + \sigma_w^2),$$

where $\sigma_x^2$ is the variance of the original signal, and $\sigma_w^2$ is the variance of the watermark.

10. A method of detecting a watermark, comprising:

designing the watermark, comprising:

defining an expected value of the difference between test statistics of two hypotheses where the watermark exists and where the watermark does not exist, respectively, as an objective function of the method;

calculating the objective function of the method for improving the detection performance by an equation using the power spectral density of an original signal and the power spectral density of the watermark; and obtaining an optimized power spectral density of the watermark from the objective function using a Lagrange multiplier method; and subjecting the watermark to a Weiner attack; and filtering the watermark from the original signal to detect the watermark.

11. The method as claimed in claim 10, wherein the step of filtering the watermark further comprising filtering the watermark using a whitening filter.

12. The method as claimed in claim 10, wherein the expected value of the difference of the test statistics is defined by the equation $E[T_1(y)-T_0(y)]$, and is used as the objective function of the optimization method for improving the detection performance, where $$T_1(y) = (x + w - h*(x+w))^T R_x^{-1} w$$

is the test statistic of the hypothesis where the watermark exists, and $T_0(y)=(x-h*x)^T R_x^{-1} w$ is the test statistic of the hypothesis where the watermark does not exist.

13. The method as claimed in claim 10, wherein the objective function is calculated by the equation $$\frac{1}{2\pi}\int_{-\pi}^{\pi}\frac{\Phi_w(\Omega)}{\Phi_x(\Omega)+\Phi_w(\Omega)}d\Omega,$$

where $\Phi_x(\Omega)$ is the power spectral density of the original signal, $\Phi_w(\Omega)$ is the power spectral density of the watermark, and $\Omega$ is a frequency within the range of $[-\pi, \pi)$.

14. The method as claimed in claim 10, wherein the power spectral density of the optimized watermark obtained from the objective function is calculated by the equation $$\Phi_w(\Omega) = -\Phi_x(\Omega) + \frac{\sqrt{\Phi_x(\Omega)}}{\frac{1}{2\pi}\int_{-\pi}^{\pi}\sqrt{\Phi_x(\Omega)}\,d\Omega}(\sigma_x^2 + \sigma_w^2),$$

where $\sigma_x^2$ is the variance of the original signal, and $\sigma_w^2$ is the variance of the watermark.

* * * * *